Aug. 14, 1928.
R. W. WILSON
LIP STICK HOLDER
Filed Dec. 24, 1926
1,680,755
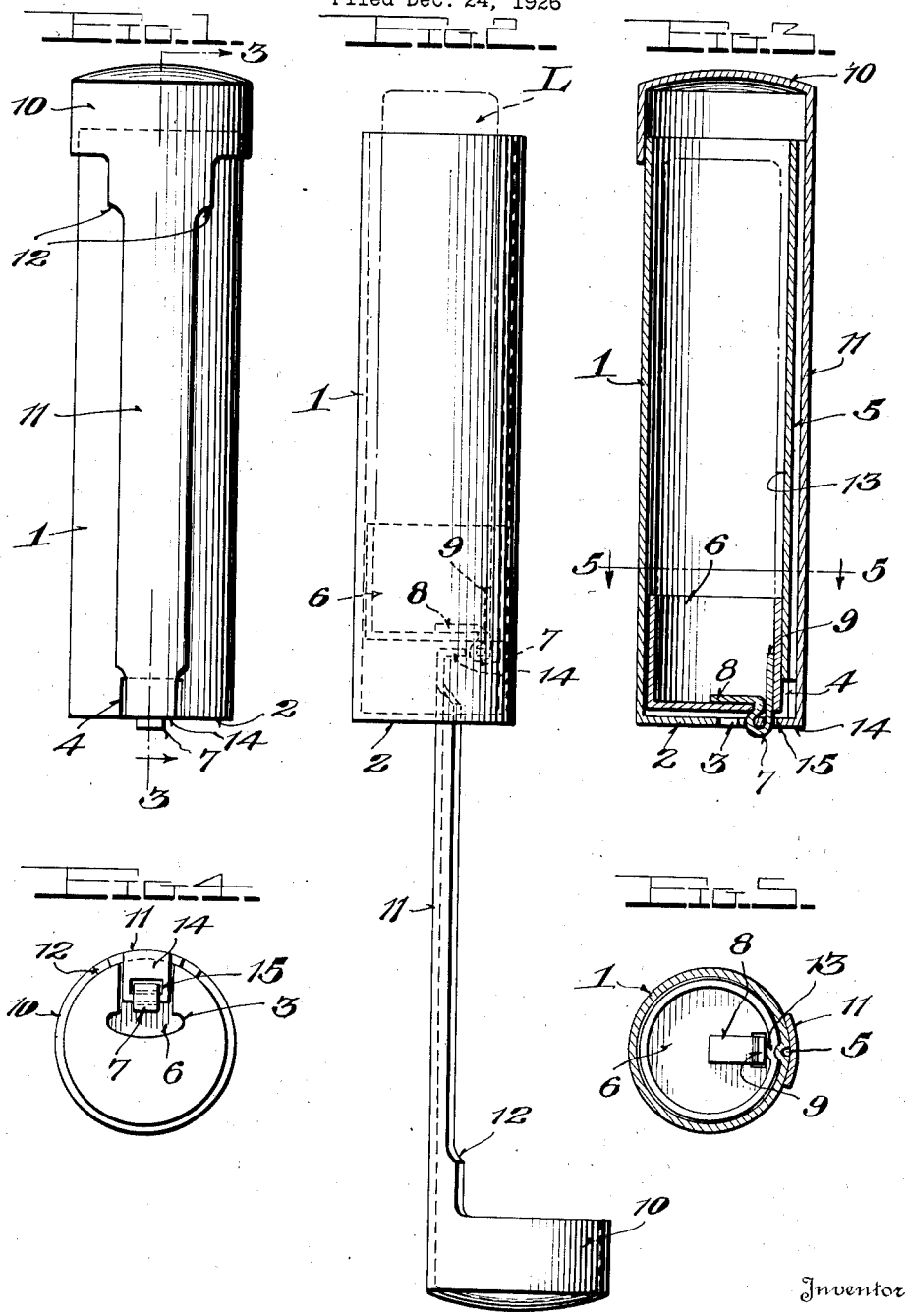
Inventor
Ralph W. Wilson
Joseph A. Miller
By
Attorney Patented Aug. 14, 1928.

1,680,755

UNITED STATES PATENT OFFICE.

RALPH W. WILSON, OF NEW YORK, N. Y., ASSIGNOR TO THEODORE W. FOSTER & BROTHER COMPANY, OF PROVIDENCE, RHODE ISLAND.

LIP-STICK HOLDER.

Application filed December 24, 1926. Serial No. 156,917.

This invention relates to certain new and useful improvements in lip stick holders, and the primary object thereof is to provide novel means, which can be easily and quickly operated, for effecting movement of the lip stick into and out of the holder, and for also reliably retaining the lip stick within the holder, so as to prevent accidental movement thereof when the holder is being carried or is not in use.

A still further object of the invention is to provide novel means for guiding the movement of the lip stick carrier along the length of the holder, and to also provide novel means for retaining the lip stick in its carrier.

The invention still further aims to provide means of the character mentioned which is of simple and economical construction and which does not detract from the appearance of the usual tubular or cylindrical holder.

In the drawings:—

Fig. 1 is an elevation of the holder in closed position of the parts;

Fig. 2 is a like view showing the parts in open position and the lip stick moved partly out of the holder;

Fig. 3 is a section on line 3—3 of Fig. 1;

Fig. 4 is a bottom view of the holder, and

Fig. 5 is a section on line 5—5 of Fig. 3.

In proceeding in accordance with the present invention a tubular or cylindrical holder or body 1 is employed, which latter is provided with a closed bottom 2 having a slot 3 adjacent its periphery, the latter merging into a slot 4 formed in the periphery of the holder 1. The holder is provided with an axial rib 5 preferably formed by indenting the holder as shown in Fig. 5. The lip stick carrier 6 is slidably mounted in the holder and has a slotted bottom through which a yoke or loop 7 extends. The leg 8 of the yoke is secured to the bottom of the carrier 6, while the leg 9 thereof extends upwardly and serves to act as a key which engages the lip stick L and prevents movement of the latter with respect to the carrier. A closure in the form of a cap 10 is slidably engaged over the open upper end of the holder and is formed with an arm 11 which latter engages the periphery of the holder and conforms to the shape of the latter. Stops 12 are provided on the arm 11 to limit the upward movement of the latter. The carrier 6 is formed with an indented part 13 similar to the part 5, these latter parts being of concave-convex cross section so that the convex side of the bead 5 acts as a guide that is received in the concave side of the bead 13, whereby it will be noted that the carrier 6 is guided in its sliding movement along the length of the holder. The inner or lower end of the arm 11 is offset at 14 and is provided with an opening 15 in which the loop 7 is received, thereby providing a hinged connection between the arm 11 and the carrier 6.

As depicted in Figures 1 and 3 of the drawings, the parts are in housed position and in order to project the lip stick from the holder for use, the cap 10 is slid outwardly carrying therewith its arm 11, until the cap is free of the body, whereupon the arm is swung downwardly to the position of Figure 2 and is then moved upwardly through the slot 3, thereby projecting the lip stick from the holder. Obviously the lip stick can be projected to any desired degree by a mere sliding movement of the arm, the latter, however, being restricted against undue sliding movement by reason of its stops 12 engaging the bottom 2.

It will also be noted that the arm of the closure operates in a plane coincident with that in which the body lies, so that a perfectly straight movement of the arm occurs in operating the latter to eject the lip stick and to move same within the holder.

Having thus described my invention what I claim as new and desire to secure by Letters Patent is:

1. In a lip stick holder, a tubular body having an inwardly struck longitudinal bead forming a guide and having a closed bottom formed with a slot which latter extends through a side of the body, a lip stick carrier slidable in the body and formed with an inwardly struck part receiving the bead, a loop extending through an opening provided therefor in the bottom of the carrier and having one leg secured to said bottom and its other leg extending upwardly to engage and hold the lip stick, a closure slidable on the body and having an arm formed to engage a side of the body, said arm being movable through said slot and having an offset perforated to receive the loop whereby to hingedly connect the arm to the carrier.

2. In a lip stick holder, a tubular body having a closed bottom formed with a slot which latter extends through a side of the holder, a lip stick carrier slidable in the body, a loop extending through an opening provided therefor in the bottom of the carrier and having one leg secured to said bottom and its other leg extending upwardly to engage and hold the lip stick, a closure slidable on the body and having an arm formed to engage a side of the body, said arm being movable through said slot and having an offset perforated to receive the loop whereby to hingedly connect the arm to the carrier.

In testimony whereof I have hereunto signed my name to this specification.

RALPH W. WILSON.